W. MORRIS.
SPRING WHEEL.
APPLICATION FILED NOV. 14, 1906.

1,011,638.

Patented Dec. 12, 1911.

2 SHEETS—SHEET 1.

WITNESSES:

INVENTOR,
William Morris,
BY Bates, Fouts & Hull,
ATTYS.

W. MORRIS.
SPRING WHEEL.
APPLICATION FILED NOV. 14, 1906.
1,011,638.
Patented Dec. 12, 1911.
2 SHEETS—SHEET 2.
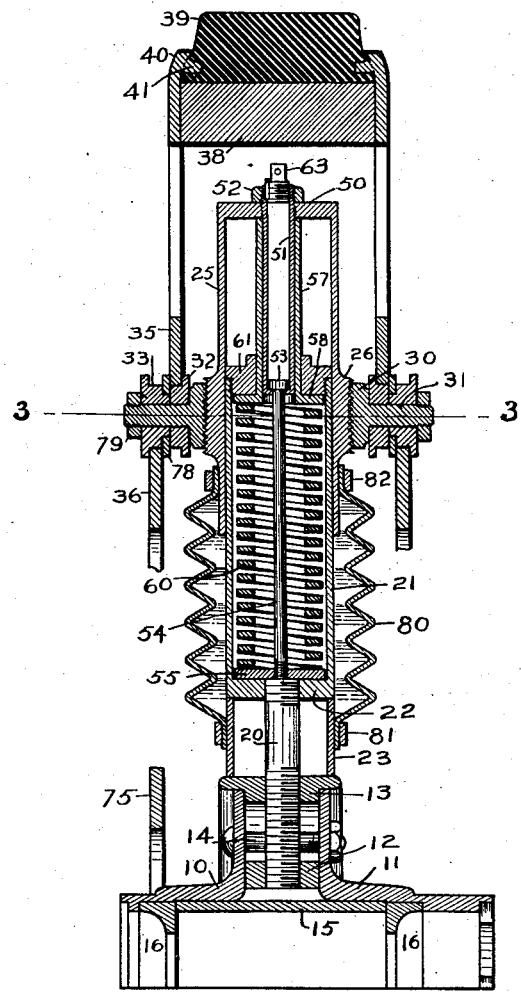
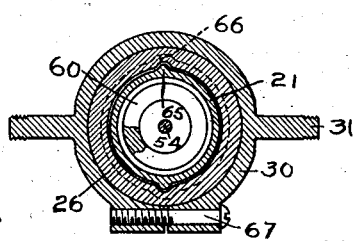
WITNESSES:
INVENTOR,
William Morris
BY
Bates, Fouts & Hull
ATTYS.

UNITED STATES PATENT OFFICE.

WILLIAM MORRIS, OF CLEVELAND, OHIO.

SPRING-WHEEL.

1,011,638. Specification of Letters Patent. Patented Dec. 12, 1911.

Application filed November 14, 1906. Serial No. 343,332.

*To all whom it may concern:*

Be it known that I, WILLIAM MORRIS, a citizen of the United States, residing at Cleveland, in the county of Cuyahoga and State of Ohio, have invented a certain new and useful Improvement in Spring-Wheels, of which the following is a full, clear, and exact description, reference being had to the accompanying drawings.

The object of this invention is to provide an efficient spring wheel which shall resiliently support the axle at all times, allowing proper freedom of movement thereof, while the driving action is accomplished independently of the springs.

My wheel is strong and rigid in construction, is not liable to get out of order, and presents a neat appearance.

The invention is hereinafter more fully described and its essential characteristics set out in the claims.

Figure 1:
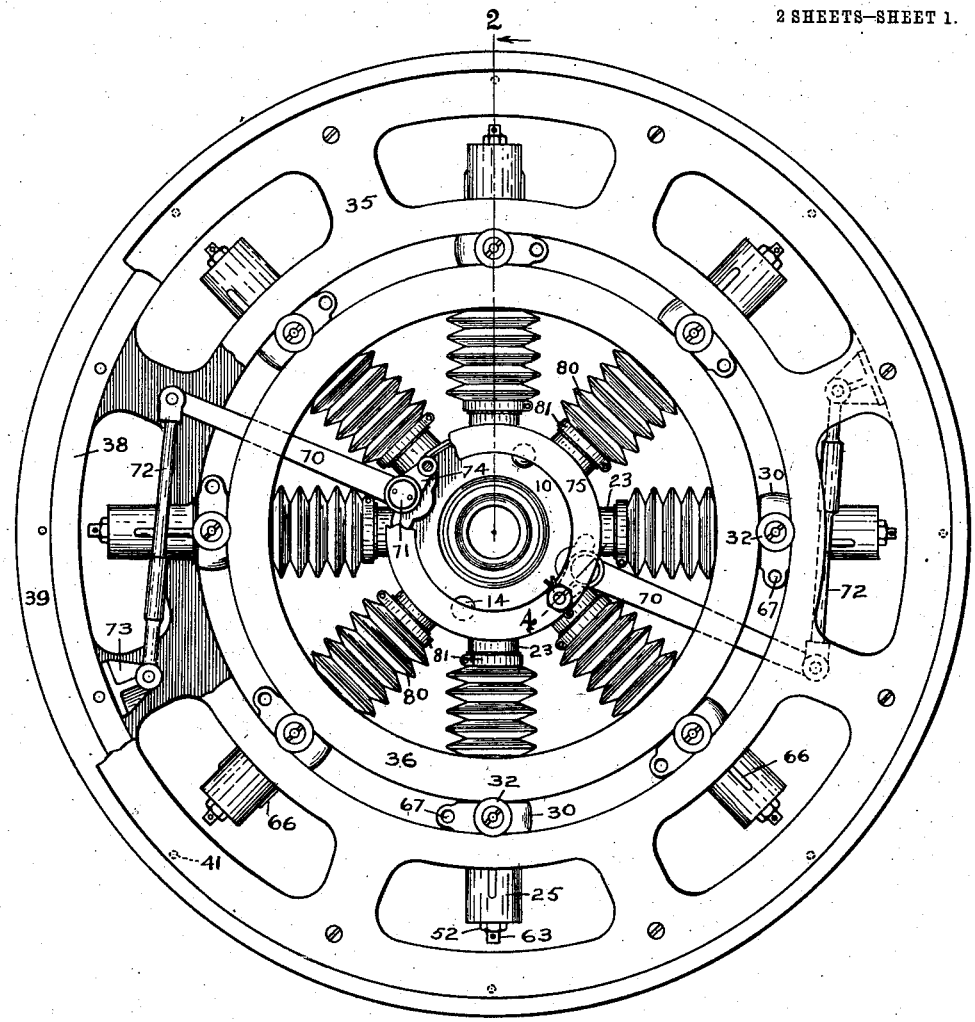
Figure 4:
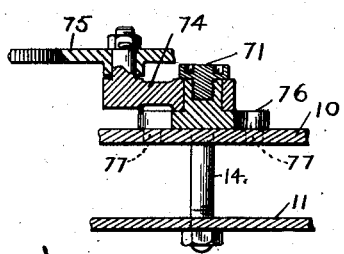

In the drawings, Figure 1 is a side elevation of my wheel; Fig. 2 is a radial section thereof, as indicated by the line 2 of Fig. 1; Fig. 3 is a cross section through one of the spokes, as indicated by the line 3—3 of Fig. 2, and Fig. 4 is a detail illustrating the means for carrying the driving bell-cranks, being a cross section on the line 4 of Fig. 1.

As shown in the drawings, the hub of the wheel is composed of the annular flange members 10 and 11, the distance rings 12 and 13, spacing them apart, the bolts 14 clamping such parts together, the inner sleeve 15 and the ball races 16, carried on the inner sides of the members 10 and 11 and at the opposite ends of the inner sleeve. The ring 13, as shown, overlaps the edges of the members 10 and 11, giving the hub a neat appearance.

Screwed into the distance rings 13 and 12 of the hub just described are radial studs 20 which carry the spokes. Each spoke is a tubular telescoping structure. The inner member of the spoke is designated 21. At its inner end is an inward flange or head 22 which is screwed on to the end of the stud 20. A suitable distance sleeve 23 lies between this head and the outer face of the ring 13, and it is preferably of the same external diameter as the spoke section 21. Slidable upon the outer surface of the spoke section 21 is the tubular sleeve 25, which has a spring connection with the spoke sleeve 21, as hereinafter explained.

Screwed onto a threaded boss 26 on the outer side of the sleeve 25, is a split collar 30 which has trunnions 31 carrying rollers 32 and 33. These rollers ride respectively upon the inner edge of annular side members 35 and on the outer periphery of an idle floating ring 36. As shown, the members 35 continue across the rim 38 and carry the tread 39 on the outer side thereof, the extreme edges of the members 35 being bent inward as at 40 to clamp the tread, and being provided with lugs 41 to lock it in place.

The spring action of the spoke is accomplished as follows: Screwed through the head 50 of the outer sleeve 25 is an axial tube 51, clamped by a jam nut 52. Within the tube is the head 53 of an axial rod 54, the inner end of which screws into an enlarged inner head or disk 55, the end of the rod being preferably upset on the underside of this head. Surrounding the tube 51 is a tube 57 having an outward flange 58. Between this flange and the head 55 is a compression spring 60, preferably made of flat bar material, helically coiled, to allow a large amount of compression and extension. A suitable plug surrounding the sleeve 57 screws into the end of the spoke sleeve 21, holding the parts tightly in place.

From the above described construction, it results that any outward movement of the spoke sleeve 21 into the sleeve 25, compresses the spring against the abutment provided by the flange 58, while any movement in the other direction of the sleeve 21, tending to withdraw from the sleeve 25, moves the flange 58 inwardly and compresses the spring against the disk 55. The spring is thus held in equilibrium and gives at either end, according to the position of the spoke and the pressure on the axle.

In assembling the spoke, the rod 54 is put through the sleeve 51, and screwed into the head 55 and upset on the underside thereof. The spring is then placed over the sleeve 51 and rod, resting on the head 55. The sleeve 57 is then placed over the sleeve 51 with its flange 58 resting on the spring. The collar 61 is then put over the tube 57. This structure being placed in the spoke sleeve 21, the collar 61 is screwed into place, giving some compression to the spring 60. The outer sleeve 25 of the telescoping spoke is screwed in place over the projecting end of the inner tube 51, and the nut 52 is screwed on, clamping the parts. A suitable plug 63 is fastened in the upper end of the tube 51 (as by means of a screw thread and pin) to furnish means for holding or turning the parts.

The space within the spoke is more or less nearly filled with grease when the parts are put together which maintains the parts properly lubricated, and will only require replenishment at rare intervals.

To prevent one of the spoke sleeves from turning with reference to the other, I may provide a rib on one of these sleeves, occupying a groove on the other. As shown in the drawings, there are two ribs 65 on opposite sides of the outer surface of the sleeve 21, occupying internal grooves made by an outward bending of the sleeve 25, as illustrated at 66. The boss 26 on the sleeve 25 is of larger diameter than the distance across the sleeve through the two bosses 66, as illustrated in Fig. 3. This enables the collar 30 to be screwed into place, as already described. When in place, this collar may be rigidly clamped by the screw bolt 67 passing through ears thereon.

From the construction above described, it will be seen that the hub may vary greatly in position from the center of the tread. The weight of the vehicle depressing the hub will compress, from the inner, the spring directly below it, and, from the outer end, the spring in the spoke above it. The springs in the spokes which happen to be in horizontal line with the hub will have little compression, and the diagonal spokes an intermediate amount.

It will be noticed that the spokes are entirely detached from the tread portion of the wheel, comprising the rim, tread, and side members 35. This independence is so complete that, with no driving connection provided from the hub to the tread portion, the spokes would be carried around idly as the hub revolves. I provide a driving connection which does not interfere with the freedom of the cushioning action of the spokes.

The driving connection referred to includes, as shown, a pair of bell cranks 70, pivoted at their elbows to ears 76 carried by the hub members 10. As shown, this ear is the head of one of the bolts 14 and is prevented from turning by lugs 77 projecting into the flange 10. A suitable capscrew 71 holds the bell-crank on the journal of the ear. The outer ends of these bell cranks are connected by links 72 with the tread portion, the links, as shown, being pivoted to brackets 73 secured to the inner surface of the rim. The ends of the short arms 74 of the bell cranks are pivoted at diametrically opposite points to a suitable cross connecting member which is in the form of a ring 75.

The driving construction does not interfere in any manner with the eccentric position and movement of the axle, the bell crank and links simply swinging on their pivots to accommodate such eccentricity. A movement of one bell crank by the hub is compensated by an opposite movement of the other bell crank. A movement of the pivots 71 with the two bell cranks in the same direction, (as when the bell cranks are horizontal) causes the short arm of one bell crank to move outwardly and the other to move inwardly correspondingly, the floating ring 75 maintaining the proper relationship to the parts. The drive is thus communicated directly from the hub to the tread, and the spokes are relieved from any driving strain.

To allow convenient removal of the wheels 32 and 33 in case of breakage, or to obtain access to the interior of the spoke, I make the wheel 32 with but one flange, viz. the inside flange. The wheel 33 is provided with an outside flange and instead of a rigid inside flange, it has a separable flange provided by a washer 78 surrounding a reduced extension on the face of the wheel 33. To remove these wheels, the nut 79 which screws onto the end of the trunnion 31 is removed. This allows the removal of the wheel 33, and there is then sufficient play between the washer 78 and the trunnion to allow the washer to be tipped over sidewise and removed. These parts being removed, the spoke sleeve 25 may be forced in radially, independent of the other spokes, to cause the flanges on the wheels 32 to clear the members 35, whereby these wheels may be removed, and, if desired, the collar 30 may be screwed off of the boss 26 (the upper end of the spoke sleeve 25 being continuously forced inward to allow the trunnions to travel in the space between the member 35 and the floating ring 36) or the spoke may be removed entirely, by a suitable pipe wrench engaging the spoke sleeve 21 and unscrewing it from the stud 20.

To prevent the accumulation of dust at the sliding junction of the spoke sections and the consequent wear of the sections, I provide a dust guard 80, consisting of a flexible and extensible sleeve surrounding the telescoping sections, and secured at one end to one section and at the other to the other section. This sleeve may be of leather, rubber, or other suitable material, and, as shown, may be accordion-plaited. It is shown as clamped at its lower end by a ring 81 to the distance sleeve 23, which is rigid with the spoke section 21, and is clamped at its other end by a ring 82 with the spoke sleeve 25. This dust guard does not interfere with the free movement of the spoke sections, prevents the escape of lubricant therefrom, and it does not interfere with the appearance of the wheel.

It will be noticed that the downward pull on the upper spokes caused by the depression of the hub has no tendency to pull downward the upper portion of the rim, the downward force being transferred by the floating ring 36 to the wheels of the lower spokes, and from thence to the lower portion of the tread. The wheel rim is thus relieved from the constant strain tending to shorten its diameter, which, in other wheels, causes more or less bending of the rim and consequent wear.

In certain spring wheels the entire weight is borne by two or three springs beneath the hub. With my wheel the springs above the hub are carrying as much weight as those below it. All the springs except those in the horizontal plane with the hub carry some of the weight, the weight on the upper spokes being transferred by the floating ring to the lower portion of the tread, independent of the lower springs, as already stated. The weight being thus distributed among a number of spokes, it is possible to make the spring of convenient size and still have them of ample strength to support a heavy vehicle, as a modern touring car.

It will be further noticed in my wheel that those wheels 32 and 33 which carry the greatest portion of the weight (viz. those on the spokes directly under and directly over the hub) have no travel. The wheels which have the most travel are those in the substantial horizontal plane of the hub and they carry substantially no weight, while the the spokes which are diagonal carry an intermediate amount of weight and their wheels have an intermediate amount of travel. It thus results that the wearing friction on these wheels is small.

I claim:

1. The combination of a hub, telescoping spokes carried thereby, trunnions carried by said spokes, wheels on said trunnions, and a tread portion having inner peripheries on which said wheels ride.

2. The combination of a hub, extensible spokes, wheels carried by said spokes, a tread portion having an inner periphery on which some of said wheels ride on their outer sides, and a floating ring on which others of said wheels ride on their inner sides.

3. The combination of a hub, telescoping spokes carried thereby, trunnions carried by said spokes, wheels on said trunnions, a tread portion having inner peripheries on which some of said wheels ride on their outer sides, and a floating ring on which other wheels on the trunnions ride on their inner sides.

4. The combination, in a spring wheel, of a tread portion carrying a track-way, a hub, telescoping spokes carried thereby, springs within said spokes, wheels carried by said spokes riding on said track-way, other wheels carried by said spokes, and a floating ring which said last mentioned wheels are adapted to engage on the opposite side from the engagement of the first mentioned wheels.

5. In a spring wheel, the combination of a tread portion having an inner circular guiding surface, a floating ring having an outer circular guiding surface, a hub, and spring spokes carrying means engaging such guiding surfaces.

6. In a spring wheel, the combination of a tread portion having an inner guiding surface, a floating ring having an outer guiding surface, a hub, spring spokes carried thereby and having means engaging such guiding surfaces, and independent means connecting the hub and tread portion.

7. The combination of a hub, a spoke sleeve rigidly carried thereby a coöperating spoke sleeve telescoping thereover, rollers carried by said last mentioned sleeve, a tread portion having an inner track-way on which the outer faces of said rollers bear, other rollers carried by said sleeve, and a floating ring having an outer peripheral track-way on which said last mentioned rollers bear.

8. In a spring wheel, the combination of a tubular spoke section, a coöperating section slidable along the section first mentioned, a spring in the inner section, a rod within said spring, a head carried by the rod opposite one end of the spring, said rod having a slidable connection with the outer sleeve.

9. The combination, in a spoke, of a pair of telescoping tubular sections, a compression spring within one of said sections, an inner tubular distance member between the spring and the head of one section, a rod connecting with the other end of the spring and extending through the spring and having a slidable connection with said inner tubular member, and a suitable stop limiting the movement of said rod within such member in one direction.

10. The combination in a spring spoke, of the telescoping sleeves 21 and 25, the tube 51, the rod 54 having a sliding and limited connection with the tube 51, a head 55 on said rod, a helical spring 60 surrounding the rod and bearing at one end on said head 55, and means for conveying movement from the sleeve 25 to the other end of the spring.

11. The combination, in a spring spoke, of the telescoping sleeves 21 and 25, the tubes 51 and 57, the rod 54 having a sliding and limited connection with the tube 51, a head 55 on said rod, a spring 60 between said head 55 and a flange 58 on the tube 57, and a nut 61 screwing into the sleeve 21 and limiting the outward movement of the flange 58.

12. The combination of a hub, an independent tread portion and driving means connecting the two, comprising bell cranks pivoted to the hub, links connecting the outer ends of the bell cranks with the tread portion, means connecting together the other ends of the bell cranks, and means for yieldingly supporting the tread from the hub.

13. The combination of a hub, spring spokes carried thereby, a tread portion, means whereby said spokes may bear on said tread portion but may be carried around independently thereof, and driving means connecting the hub with the tread portion and comprising bell cranks pivoted to the hub and linked with the tread portion, and a suitable connection between the inner ends of the bell cranks.

14. The combination of a tread portion consisting of a rim and two side plates whose inner edges present a track-way, a hub, spring mechanism carried thereby and having wheels riding on said track-way, and driving means independent of the spokes connecting the hub with the tread portion.

15. In a spring wheel, a hub composed of a pair of members, a distance ring between them, and clamping bolts, combined with radial studs projecting from the hub, and spring spokes carried by said studs.

16. The combination in a spring wheel, of a tread portion, a trackway carried thereby, a hub, telescoping spokes carried thereby, springs within said spokes, and means carried by said spokes intermediate their ends and bearing on said trackway, and a driving connection between the hub and tread portion.

17. The combination of a hub member, a tread member movable with relation to said hub, of a track, spring spokes carried by one of the above mentioned members and coöperating with the track at points intermediate their ends, and driving means independent of the spokes between the said members.

18. In a spring wheel, the combination with a hub member and a tread member, a track supported by said tread portion and movable relatively to said hub, of radial telescoping spokes carried by the hub portion and engaging with the track at points intermediate their ends, there being rolling contact between the spokes and track, and driving means independent of the spokes connecting the hub portion with the tread portion.

In testimony whereof, I hereunto affix my signature in the presence of two witnesses.

WILLIAM MORRIS.

Witnesses:
ALBERT H. BATES,
W. L. McGARRELL.

Copies of this patent may be obtained for five cents each, by addressing the "Commissioner of Patents, Washington, D. C."